US007984695B1

(12) United States Patent
Shaffer

(10) Patent No.: US 7,984,695 B1
(45) Date of Patent: Jul. 26, 2011

(54) PET DOOR

(76) Inventor: Jeffrey M. Shaffer, Bartlesville, OK (US)

( * ) Notice: Subject to any disclaimer, the term of this patent is extended or adjusted under 35 U.S.C. 154(b) by 556 days.

(21) Appl. No.: 12/034,929

(22) Filed: Feb. 21, 2008

(51) Int. Cl.
*A01K 1/02* (2006.01)
*A01K 1/03* (2006.01)

(52) U.S. Cl. ........................................................ 119/501

(58) Field of Classification Search .................. 119/484, 119/494, 495, 501
See application file for complete search history.

(56) References Cited

U.S. PATENT DOCUMENTS 2,758,646 A * 8/1956 Johnson ........................ 160/354
3,874,118 A 4/1975 Robinson
4,173,099 A 11/1979 Robb
4,480,407 A 11/1984 Needham et al.
4,840,217 A * 6/1989 Evans, III .................. 160/368.1
5,581,940 A 12/1996 Peterson
6,681,524 B1 1/2004 Tillson
7,213,368 B1 5/2007 Eliasen

* cited by examiner

*Primary Examiner* — Rob Swiatek
*Assistant Examiner* — Valentina Xavier
(74) *Attorney, Agent, or Firm* — Molly D. McKay

(57) ABSTRACT

A pet door employing a pair of flaps secured to a frame installed in an opening in a door or wall. Each flap is hinged at the top to the frame so that the flap opens away from the frame. An outwardly angled flange extends around both sides and the bottom of each flap. The flange allows a pet to nuzzle open the flap located on the side of the frame from which the pet is approaching. Once the pet has opened the first flap, the pet opens the opposite second flap by pushing against it. The angled flanges prevent a pet from being trapped between a flap and the frame of the pet door. Optionally, weights may be provided on the flaps to aid in closing the flaps, and the frame may be provided with a gasket to further seal the flaps with the frame.

1 Claim, 2 Drawing Sheets

PET DOOR

BACKGROUND OF THE INVENTION

1. Field of the Invention

The present invention is a new type of pet door that includes a frame that mounts in an opening created for this purpose in a door or wall 18 of a building. A flap is hinged at the top of the frame on either side of the frame so that the flaps open by swinging away from the frame. Each of the flaps is provided with an outwardly angled flange that extends around three sides of the flap. This flange allows a pet to nuzzle open the flap located on the side of the frame from which the pet is approaching. Once the pet has opened the first flap, the pet opens the opposite second flap by pushing against it.

2. Description of the Related Art

Various types of pet doors are available in the marketplace. One popular type employs a double frame rubber door arrangement that hinges at the top and is opened by a pet pushing on the door. When the pet pushes on the door one frame swings outward, or alternately, the other frame swings inward, depending on the direction the animal is traveling as it passes through the door. After the pet passes through the door, the door and the double frames hang downward to form a barrier to water and air passing there through. The issue with this kind of door is that wind blows it open or air pressure in the house blows it open, thus causing loss of heat or cooling.

Another type of pet door has two separate doors located side by side so that a pet pushes against one door to enter and pushes against the other door to exit. Additionally, this type of pet door requires the pet to learn which door to push against when entering and which door to push against when exiting, adding to the difficulty of teaching the pet how to operate this type of door. This type of pet door also has the disadvantage of requiring a larger total opening than for those pet doors where the pet enters and exits through a single door opening.

Other types of dog doors are hinged on the side instead of at the top and have springs to close the door instead of allowing the door to close under the influence of gravity. U.S. Pat. No. 3,874,118 is one such dog door. This patent teaches a flange on only one side of the door. This spring loaded door will often startle the pet as the pet attempts to pass through them, causing the pet to recoil. When the pet recoils, the pet's head, tail or other appendage can become trapped between the door and the door frame, further scaring the animal and potentially causing the animal to react in such a manner as to injury or even possibly kill the pet.

The present invention addresses these problems by providing a dog door with a frame that installs in a single door opening and employs dual flaps hinged at the top and located on either side of a frame to thereby prevent unwanted air or moisture from passing through the frame. Each flap is provided with an outwardly angled flange that extends around three sides of the flap, i.e. the right and left sides and the bottom of the flap. This flange allows a pet to instinctively nuzzle open the flap located on the side of the frame from which the pet is approaching. Once the pet has opened the first flap, the pet opens the opposite second flap by pushing against it. The flanges on the flaps allow the animal to open the doors in a more natural way by nuzzling the doors open and also prevent an animal from being trapped between one of the flaps and the frame. An additional advantage to this design is that wind blowing inward pushes against the outside flap 12 and helps seal the door. Likewise, air pressure blowing outward from the building pushes against the flap 12 and helps seal the door.

SUMMARY OF THE INVENTION

The present invention is a new type of pet door. More specifically, the present invention is a pet door that employs a pair of flaps that are secured to a frame which is to be installed in an opening created for this purpose in a door or wall 18 of a building. Each of the pair of flaps employed on the pet door is hinged at the top to the frame so that the flap opens outward away from the frame. Each of the flaps is also provided with an outwardly angled flange that extends around three sides of the flap on both the left and right sides and at the bottom of the flap. This flange allows a pet to nuzzle open the flap located on the side of the frame from which the pet is approaching. Once the pet has opened the first flap, the pet opens the opposite second flap by pushing against it. The angled flanges provided on the flaps of this pet door prevent a pet from having its head or one of its appendages trapped by the flaps of the pet door. The flaps are preferably constructed of clear or transparent material, but the invention is not so limited. Also, optionally, a weight may be provided on the flaps as an aid to closing tightly against the frame. The frame may also optionally be provided with a gasket to help seal between the frame and flap when the flap is closed. Outside wind or inside air pressure push the respective outside or inside flap 12 closed, further minimizing the loss of heating or cooling.

Figure 3:
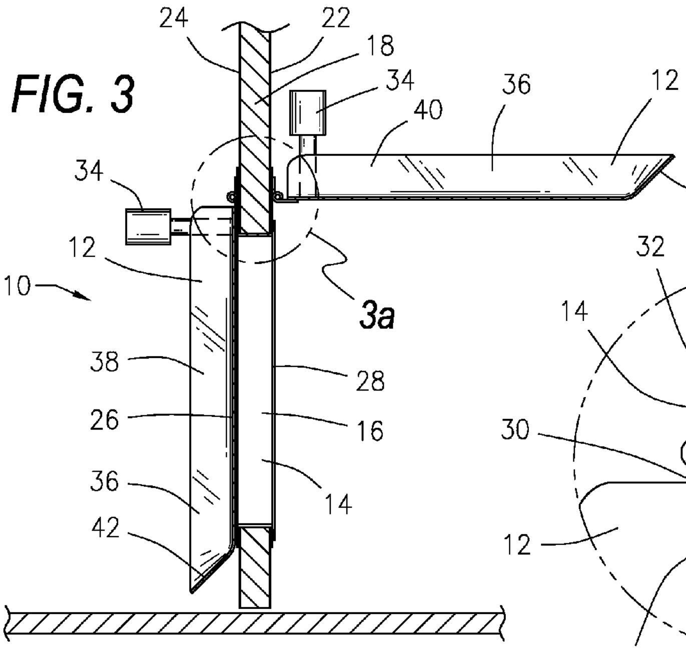
FIG. 3 is a cross-sectional view taken along line 3-3 of FIG. 2.
Figure 3A:
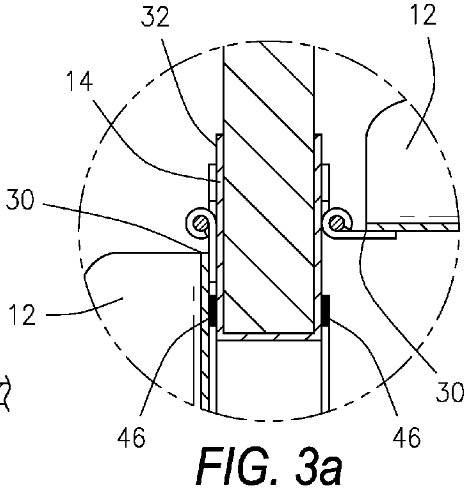

FIG. **3*a* is an enlarged view of the area shown within circle 3*a* of FIG. 3**.

Figure 4:
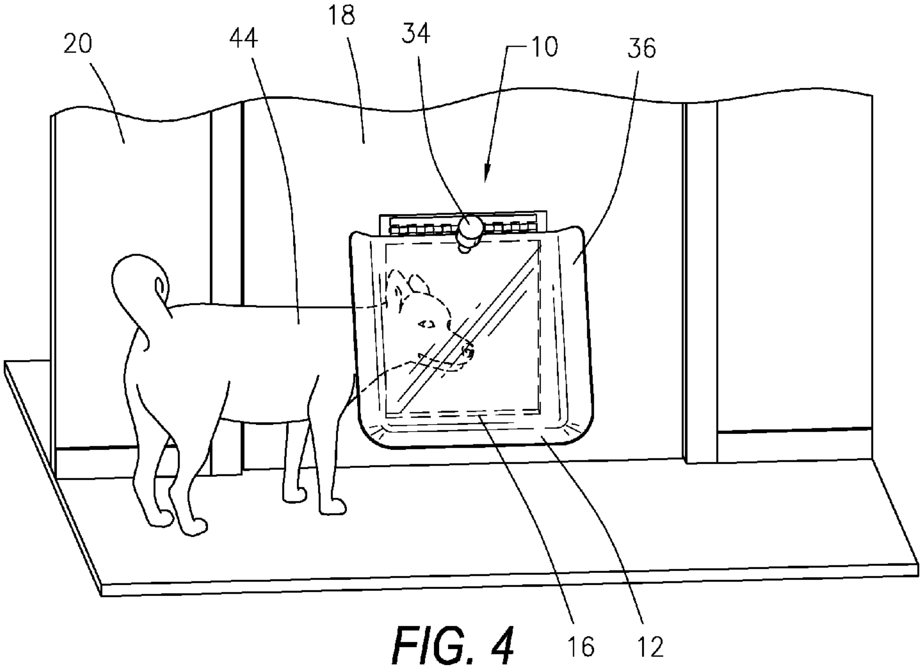

FIG. 4 is a perspective view of the pet door shown with a pet exiting through it.

DETAILED DESCRIPTION OF THE PREFERRED EMBODIMENT

Figure 1:
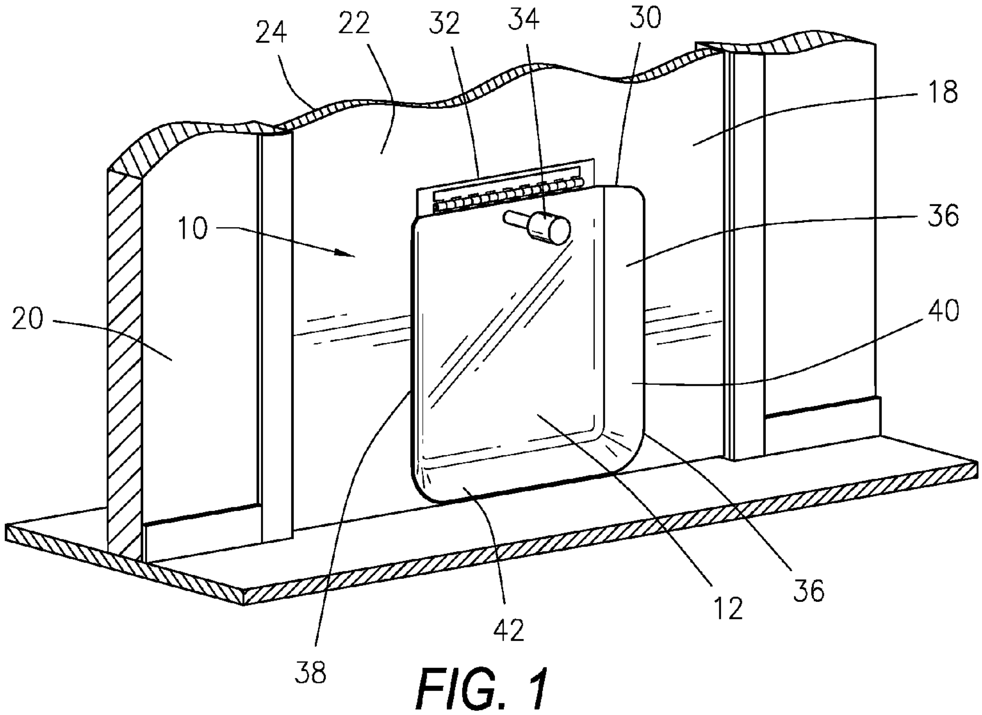
FIG. 1 is an inside perspective view of a pet door constructed in accordance with a preferred embodiment of the present invention.
Figure 2:
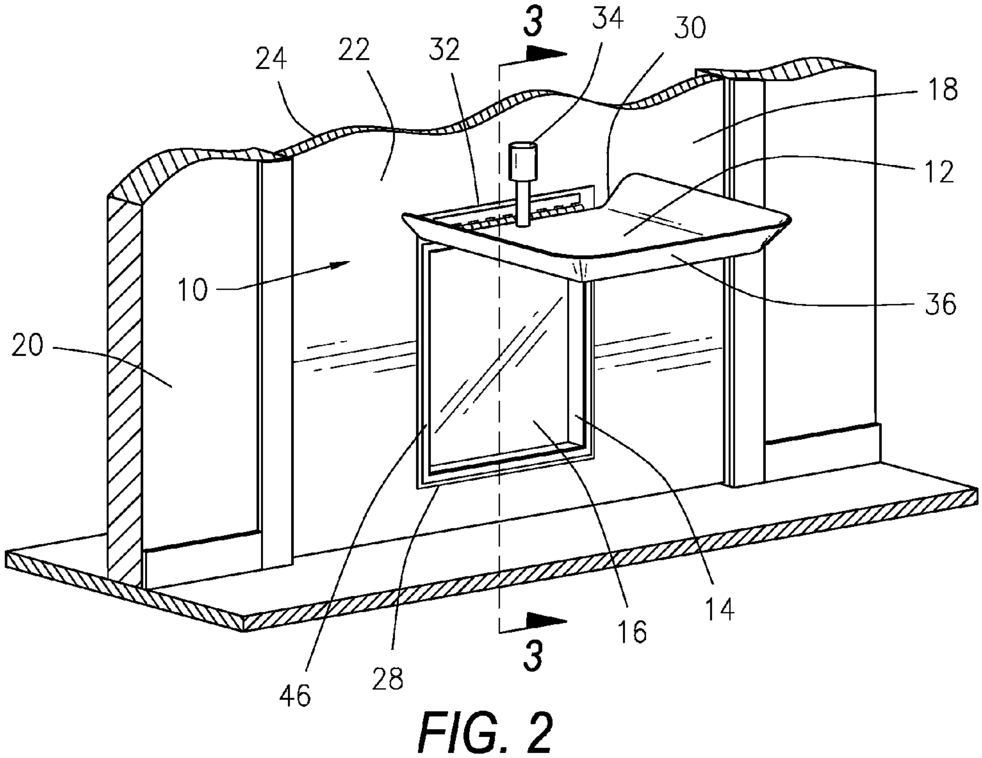
FIG. 2 is the pet door of FIG. 1, shown with the inside flap of the pet door swung upward to a fully opened position.

Referring now to the drawings and initially to FIGS. 1, 2 and 3, there is illustrated a pet door 10 that is constructed in accordance with a preferred embodiment of the present invention.

The pet door 10 employs a pair of flaps 12 that are secured to a frame 14 which is to be installed in an opening 16 created for this purpose in a door or wall 18 of a building 20. The frame 14 installs between the interior and exterior sides 22 and 24 of the door or wall 18 so that an exterior side 26 of the frame 14 is located on the exterior side 24 of the door or wall 18 and the opposite interior side 28 of the frame 14 is located on the interior side 22 of the door or wall 18, with the interior side 28 of the frame 14 facing in an opposite direction from the exterior side 26 of the frame 14.

Referring also to FIG. **3*a*, each of the flaps 12 is movably hinged along a top edge 30 the flap12 to a top 32 of the frame 14 so that each flap12 opens outward away from the frame 14 and re-closes under the influence of gravity. Optionally, as illustrated in FIG. 1, a weight 34 may be provided on the flaps 12 as an aid to closing the flaps 12 tightly against the frame 14. The weight 34 is preferably placed at the top 30 of the flap 12, slightly extended outward from the flaps 12. Due to the placement of the weight 34 at the top 30 of the flap, the weight exerts the most closing force on the flap 12 when the flap 12** is in the closed position and exerts the least closing force when the flap 12 is open. In addition, if the flap 12 is mounted on a wall or door 18 that is not perfectly vertical so that the wall or door leans slightly from vertical, the pet flap 12 is still pushed closed, unlike a pet door flap that has a weight simply placed on the bottom of the flap. The present pet door 10 also has advantage over a spring loaded door flap. The spring of a spring loaded door flap provides the least closing force when the door flap is closed and the most closing force when the door flap is open, which discourages pets from proceeding through the door flap.

Referring also to FIGS. 1-4, each flap 12 is also provided with a continuous outwardly angled flange 36 that extends around three sides 38, 40 and 42 of the flap 12, i.e. on both the left and right sides 38 and 40, respectively, and at the bottom 42 of the flap 12. As shown in FIG. 4, this flange 36 allows a pet 44 to nuzzle open the flap 12 located on the side 26 or 28 of the frame 14 from which the pet 44 is approaching. Once the pet 44 has opened the first flap 12, the pet 44 opens the opposite second flap12 located on the other side 28 or 26 of the frame 14 by pushing against it.

The angled flanges 36 provided on the flaps 12 prevent a pet 44 from having its head or one of its appendages trapped between the frame 14 and the flaps 12 of the pet door 10 should the pet 44 become scared of the pet door 10 and draw back when attempting to pass through the opening 16.

The flaps 12 are preferably constructed of clear or transparent material to allow the pet 44 to see through them, but the invention is not so limited.

The frame 14 may optionally be provided with a sealing gasket 46 to help seal between the frame 14 and flaps 12 when the flaps 12 are closed. Alternately, the flaps 12 may be constructed of a material that seals against the frame 14 when the flaps 12 are closed, such as for example rubber or similar material.

While the pet door 10 has been described and illustrated as having a single weight 34 provided at the center of the top edge 30 of each flap 12, the invention is not so limited and more than one weight 34 may be provided anywhere along the top edge 30 even extending onto the left and right flanges 38 and 36 of the flaps 12.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A pet door comprising:

a frame for installation in an opening created for this purpose in a door or wall so that an exterior side of the frame is located on an exterior side of the door or wall and the other interior side of the frame is located on an interior side of the door or wall, a first flap movably hinged on its top side to the exterior side of the frame so that the first flap opens away from the frame, a second flap movably hinged on its top side to the interior side of the frame so that the second flap opens away from the frame, a continuous, curved flange provided on three sides of the edge of each flap, each flange curved so that the outermost edge of the flange extends away from the frame to form a smooth outwardly curving surface for a pet to nuzzle to open the flap, and a weight secured to a movable part of each flap, said weight provided extending outward from each flap as an aid to closing the flaps tightly against the frame, each said weight located on the top of the flap near where the flap is movably hinged to the frame so that the weight exerts maximum downward force on the flap when the flap is closed against the frame and exerts less downward force on the flap when the flap is being opened.

* * * * *